(No Model.)
C. H. PALMER.
AUTOMATIC AND SELF ADJUSTING BEARING FOR DYNAMO ELECTRIC MACHINES.
No. 304,232. Patented Aug. 26, 1884.
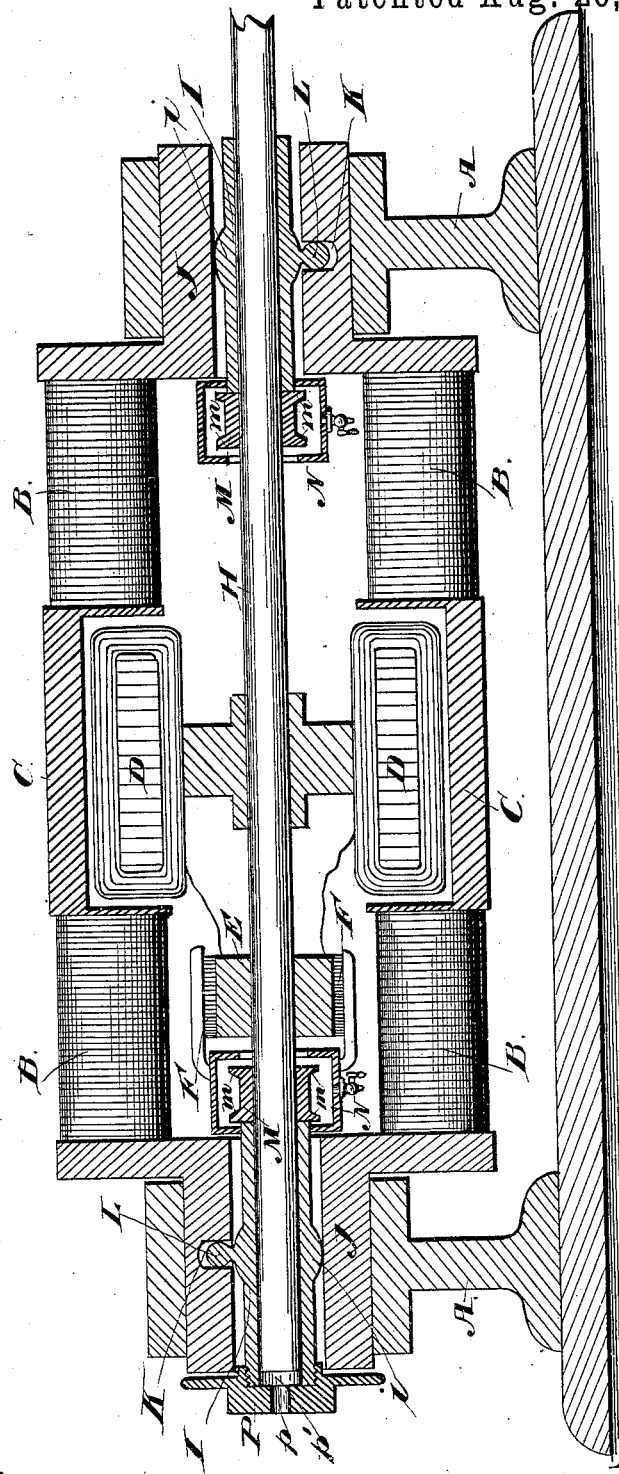
Witnesses:
Charles S. Hyer.
Roger Melling
Inventor:
Charles H. Palmer.
By

UNITED STATES PATENT OFFICE.

CHARLES H. PALMER, OF NEW YORK, N. Y.

AUTOMATIC AND SELF-ADJUSTING BEARING FOR DYNAMO-ELECTRIC MACHINES.

SPECIFICATION forming part of Letters Patent No. 304,232, dated August 26, 1884.

Application filed June 2, 1884. (No model.)

*To all whom it may concern:*

Be it known that I, CHARLES H. PALMER, a citizen of the United States, residing at New York, in the county of New York and State of New York, have invented certain new and useful Improvements in Automatic and Self-Adjusting Bearings for Dynamo-Electric Machines, of which the following is a specification, reference being had therein to the accompanying drawing.

My invention relates to improvements in dynamo-electric machines; and it has for its object, first, to provide an automatically-acting and self-adjusting bearing for the shaft carrying the rotating armatures, so as to render the current generated as nearly uniform as possible; second, to provide that the lubricant employed in the shaft-bearings shall not come in contact with the wires of the coil and interfere with their efficient insulation, and, third, to provide that the lubricant shall be confined to the journal and prevented from escaping in either direction upon the shaft within defined limits.

In this art much trouble has arisen from the fact that the coil-wires and other wires have become saturated with the lubricant which is used upon the journals of the shaft, said oil materially affecting the insulation of the wires in the coils, and also the liability of the oil to be thrown out upon the armature by the centrifugal force due to the revolutions of the shaft has proved a serious bar to the successful generation of a proper current. The varying resistance arising upon different parts of the peripheries of the armature and commutator has given a wrenching action to the armature-shaft as heretofore constructed, and this feature has been resisted by rigid bearings for the shaft. I provide self-adjusting universal bearings to accommodate this action without loss of power.

My invention is fully illustrated in the accompanying drawing, which forms a part of this specification, and in which the figure represents a longitudinal vertical section, with the armature-shaft in elevation.

The objects of the invention having been thus explicitly stated as confined to the shaft-bearings and to the means for controlling the lubricating material employed therein, it will only be necessary to refer to the other features illustrated in general terms, it being understood that they form no material part of this invention, and may be of any well-known and approved construction and arrangement.

A designates the rigid frame of the machine; B B, the field-magnets; C, the polar-extension; D, the armature; E, the commutator, and F the commutator-brush. The armature D is arranged to travel about the poles of the field-magnets in the usual manner, as its shaft H is rotated by proper pulley-connections. (Not shown.) This shaft H of the rotating armature is journaled in self-adjusting bearings I, which consist of hollow cylindrical sleeves having spherical bearings $i$, which have their seats in the journals J, as shown. Each of the journals J is provided with a recess, K, in which works loosely a ball projection, L, formed on the exterior of the sleeve I. In one journal J this recess K is in the lower side, as shown upon the right in the accompanying illustration, and in the other journal the said recess is in the upper side. The spherical bearings $i$ fit snugly within the journals, and the bearings I are arranged in connection with the shaft of the moving armature, so as to permit it during its rapid revolutions to run smoothly, so as to generate an unvaried current and produce a uniform light.

Rigid with the shaft H, or formed thereon, is a spool, M, having flanges $m$ upon either side, as shown. These spools are arranged close to either of the bearings or sleeves I, and the centrifugal force of the shaft will incline any excess of lubricant outward upon the flanges $m$, from which flanges such oil or the like will be thrown into a cup or annular vessel, N, secured one to each of the sleeve-bearings I. These cups N surround the said spools, and the shaft H projects through a proper aperture formed in their inner ends. It will be observed that the lubricant by this arrangement cannot pass inward to the armature, because the centrifugal force will expel any excess of lubricant from the first or outer flange into the vessel N, and that if any, as in temporary stopping of the shaft, should gravitate upon the body of either spool, it will be thrown in a similar manner from the inner or second flange. By this means I effectually prevent any of the lubricant from coming in contact with the wires of the coils to interfere with their proper insulation.

Suitable means may be provided to allow the oil or other lubricant to be carried off from the vessel N.

To confine the lubricant to the journals and compel it to travel inward in the direction of the receptacles N, I provide a cap, P, which is internally threaded and secured to the outer end of the bearing-sleeve I, said cap having a central air-hole, as $p$. The lubricant may be inserted at this point, and between the body of this cap and the end of the shaft H is formed or may be left a considerable chamber, as $p'$, for the said lubricant.

The operation and adaptation of the invention will be understood readily from the foregoing description taken in connection with the drawing. The rotating shaft and its armatures receive their motion from a belt and pulley in the usual manner. Any shifting or lateral movement of the shaft, owing to unequal weight of the coils on the armatures, is compensated by the universal bearings of said shaft, as above described. The lubricant which has heretofore found access to the wires of the coil is prevented from reaching the same by the internal receptacles, N, above described, thus insuring the insulation of the wires as long as the machine lasts. The commutator-brushes and commutator-disks between the field-magnets are out of the way and not subject to disturbance.

Modifications in details of construction may be made without departing from the principle or sacrificing the advantages of my invention, the essential features of which have been fully explained.

Having thus fully described the invention, what I claim, and desire to secure by Letters Patent of the United States, is—

1. In a dynamo-electric machine, and in combination with the armature shaft and frame, a sleeve or sleeves serving as journals for said shaft and having universal bearings in the said frame, as and for the purposes set forth.

2. In combination with the armature shaft and frame or journals J, having recesses K, the sleeves I, serving as journals for the shaft, and having spherical bearings, as $i$, and ball projection, as L, as and for the purposes set forth.

3. In combination with the sleeve I and shaft H, the cap P, having passage $p$, and the whole adapted to serve as and for the purposes specified.

4. In a dynamo-electric machine, and in combination with the armature-shaft thereof, an oil-receptacle surrounding said shaft, and annular flanges rigid with said shaft, to prevent the passage of lubricant toward the armature or commutator, as set forth.

5. The shaft H, having spool M, with flanges $m$, combined with the vessel N, and the whole adapted to serve as set forth.

6. The shaft H, cap P, and journal-sleeves, combined with the spool M, having flanges $m$, and the vessel N, as set forth.

CHARLES H. PALMER.

Witnesses:
N. W. PALMER,
JOSEPH HEINRICH.